(12) United States Patent
Ito et al.

(10) Patent No.: US 6,210,193 B1
(45) Date of Patent: Apr. 3, 2001

(54) CARD READER CONNECTOR

(75) Inventors: Tomoaki Ito, Machida; Akiyoshi Oshitani, Sayama; Shigetoshi Yamaguchi, Sagamihara, all of (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/286,684

(22) Filed: Apr. 5, 1999

(30) Foreign Application Priority Data

Apr. 3, 1998 (JP) .................................................. 10-108636

(51) Int. Cl.[7] .................................................. H01R 13/62
(52) U.S. Cl. .................................................. 439/326
(58) Field of Search .................................. 439/59–62, 83, 439/326, 327, 357, 629

(56) References Cited

U.S. PATENT DOCUMENTS

| | | |
|---|---|---|
| 3,576,516 | 4/1971 | Mull . |
| 5,226,826 | 7/1993 | Nillson et al. ............................ 439/72 |
| 5,320,552 | 6/1994 | Reichardt et al. ..................... 439/331 |
| 5,603,629 | 2/1997 | DeFrasne et al. ..................... 439/331 |
| 5,718,609 | 2/1998 | Braun et al. ........................... 439/630 |
| 5,813,878 | 9/1998 | Kuwata et al. ........................ 439/326 |

FOREIGN PATENT DOCUMENTS

| | | |
|---|---|---|
| 0515897B1 | 5/1992 | (EP) . |
| 0840246A2 | 10/1997 | (EP) . |
| 8-241754 | 3/1995 | (JP) . |
| 10-106674 | 9/1996 | (JP) . |

*Primary Examiner*—Khiem Nguyen
(74) *Attorney, Agent, or Firm*—Stacey E. Caldwell

(57) ABSTRACT

The card reader connector for a SIM card comprising an insulative body and a cover pivotably mounted on pivot pins of the insulative body for movement between an open and closed position wherein contact portions of terminals mounted in the insulative body electrically connect with contacts of the card when the cover is in the closed position. The cover is slidably movable in a direction perpendicular to an axis of the pivot pins. A locking means is provided between the cover and the insulative body comprising an L-shaped engaging piece on the insulative body and a corresponding actuating piece on the cover which interengage when the cover is in its closed position to lock the cover to the insulative body. A leaf spring biases the cover in a direction away from the insulative body. The connector is characterized in that when the cover is moved to its closed position, it is slidably moved rearwardly, toward the axis of the pivot pins, to produce a spring force. Therefore, when the cover is in its closed position, it is in a fully locked position by the resilient spring force imparted by the leaf spring. The card reader connector therefore facilitates insertion and removal of the card and maintains its integrity and robustness irrespective of its small size.

7 Claims, 5 Drawing Sheets

CARD READER CONNECTOR

FIELD OF THE INVENTION

The present invention relates generally to an electrical connector for a card, particularly, to a hinged card reader connector for a card such as a SIM (Subscriber Identity Module) card used in a portable telephone, such as a cellular phone.

BACKGROUND OF THE INVENTION

Known card reader connectors, such as the connecting devices disclosed in Japanese Heisei 5-502959 and Japanese Unexamined Patent Publication No. Heisei 9-185973, generally include an insulative body and a cover pivotally mounted on the insulative body for pivotal movement between an open and closed position. Contact areas on terminals mounted on the insulative body are adapted to mate with corresponding circuit conductors of a card inserted between the insulative body and the cover. Such a card reader is often mounted on a circuit board inside a cellular phone, so that the specific information loaded on the card can be accessed by the cellular phone user. The terminals typically include solder tails projecting outwardly from the insulative body, so that the card reader connector is connected to the circuit board by soldering the solder tails to corresponding circuit conductors on the underlying circuit board. After inserting the card into the connector while the cover is in its open position, the cover is closed and locked in the closed position. To remove the card, the lock is released, the cover is opened, and the card is manually extracted.

With hinged connectors such as those described above, it is desirable that the card be easily inserted and removed. There has also been a desire for miniaturizing this type of connector, and this makes operation of the smaller connectors less user friendly than their larger counterparts. For example, in the connectors disclosed in the above publications where a front end of a cover must be pulled for its release, it can be difficult to move the cover due to the small size. Furthermore, the presence of lock springs on both sides of the cover in the disclosed connectors results in less overall rigidity and strength in the cover and results in a card reader connector that is less robust than its larger counterparts.

SUMMARY OF THE INVENTION

The present invention solves the problems set forth above. It is therefore an object of the present invention to provide a hinged card reader connector having a cover which easily moves between its open and closed positions even if the connector is downsized, and which maintains strength and stiffness in its cover during movement between its open and closed positions.

To accomplish the above-mentioned object, the present invention contemplates a card reader connector constructed such that a hinged cover is slidably pivoted relative to an insulative body.

Namely, according to one aspect of the present invention, the hinged card reader connector for receiving a card comprises:

an insulative body including pivot pins integrally formed at one end thereof;

a cover pivotally supported on the insulative body at one end by the pivot pins;

terminals provided on the insulative body for contacting corresponding contacts on the card;

the cover being pivotably movable in a direction perpendicular to the axis of the pivot pins between an open position and a closed position; and a resilient member for biasing the cover in a direction away from the pivot pins.

The disclosed card reader connector for a card further comprises locking means between the cover and the insulative body which holds the cover in the closed position by being biased by the resilient member. The locking means includes an L-shaped engaging piece on a portion of the insulative body and an actuating piece on the cover; wherein the cover is placed in the closed condition by sliding contact between a horizontal projecting piece on the engaging piece and an inclined piece formed on an end of the actuating piece during movement between the open position and the closed position.

The locking means in one embodiment includes an engaging arm having an engaging projection piece on an inside end of the actuating piece, an opening portion on a side wall of the cover adapted for opposing the engaging projection piece, and an actuating projection portion provided adjacent to the opening portion, wherein the cover is slidingly moved from its open position to its closed position to spread the engaging arm by the actuating projection portion and release the engagement between the engaging projection piece and the opening portion to lock the cover in its closed position.

The invention contemplates that the cover is slidably pivotable in a direction perpendicular to the axis of the pivot pins, and further contemplates that one of the cover or insulative body includes a resilient member for biasing the cover in a direction away from the pivot pin when the cover is in the closed position. Therefore, upon moving the cover from the open position to the closed position, the cover is slidably pushed toward the axis of the pivot pins against the resilient member to produce a spring force. Therefore, when the cover is completely closed, it is moved into a fully locked position by the spring force and held in place by the locking means. To move the cover from the closed position to the open position, the cover is again pushed toward the axis of the pivot pins and the cover is opened with the aid of a restoration force of the terminals mounted on the insulative body.

The horizontal projecting piece on the insulative body and the inclined piece on the cover slidingly contact one another during movement of the cover between the open and closed positions and resist the force provided by the resilient member so that the inclined piece is moved downwardly to lock the cover smoothly.

It is easy to release the engagement between the engaging arm on the insulative body and the opening portion on the cover by slidingly moving the cover toward the axis of the pivot pins.

The card may be mounted and held on the insulative body by the use of opposing guides provided on the side edges of the cover.

The subject design therefore permits the cover to be easily moved between its open and closed position and therefore facilitates insertion and removal of a card. Furthermore, sufficient rigidity of the cover is maintained, irrespective of the reduced overall size of the card reader connector.

Other features, aims and advantages of the invention in its various aspects and embodiments will become apparent from the following description of the disclosed embodiments given by way of example only and in which:

DESCRIPTION OF THE PREFERRED EMBODIMENT

Figure 1:
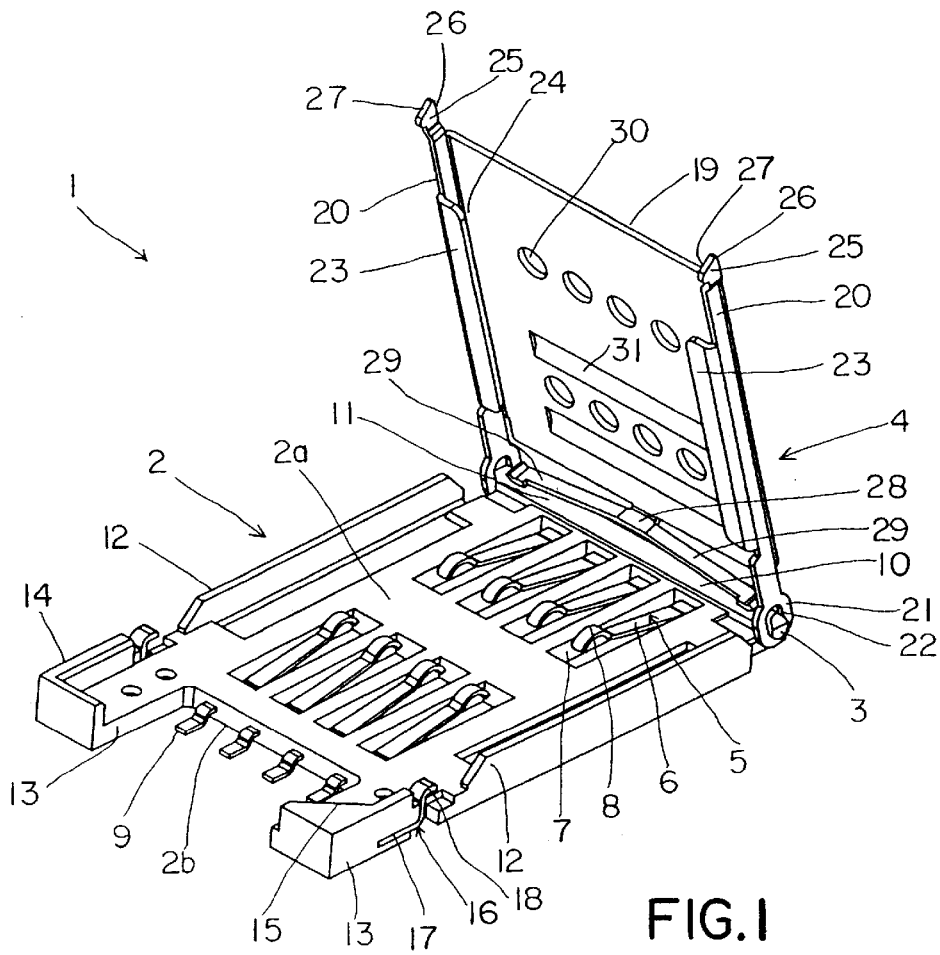
FIG. 1 is a perspective view of a first embodiment of a card reader connector according to the present invention, as viewed from the front side with the cover is in its open position.

The present invention will be discussed hereinafter in terms of the preferred embodiments of the invention with reference to the accompanying drawings. In the following description, details are set forth in order to provide a thorough understanding of the present invention. It will be obvious, however, to those skilled in the art that the present invention may be practiced without these specific details. In other instances, known structures are not shown in detail in order to avoid unnecessarily obscuring the invention.

FIGS. 1 through 4 illustrate a first embodiment of a card reader connector 1 for a card such as a SIM card (see FIG. 7) used in a cellular phone. The card reader connector 1 includes an insulative body 2 and a cover 4 pivoted thereon for pivotally moving between an open and a closed position via pivot pins 3 provided on opposite sides of a rear edge of insulative body 2. Insulative body 2 is molded of insulative plastic in the form of a rectangular plate, and includes a plurality of terminals 5 mounted in the body by insert molding. Each terminal 5 includes a cantilever arm-shaped contact piece 6 located within a recess portion 7 formed on an upper surface 2a of insulative body 2, and a contact portion 8 projecting above upper surface 2a. Each contact portion 8 is adapted to contact a corresponding contact pad of a circuit conductor of the SIM card mounted between insulative body 2 and cover 4. Each terminal 5 further includes a solder tail 9 extending from contact piece 6 forwardly and rearwardly of insulative body 2 substantially flush with a lower surface 2b of insulative body 2 and adapted to be soldered to corresponding conductive traces of an underlying printed circuit board on which the card reader connector 1 is to be mounted.

The ends of pivot pins 3 are circular in cross section and project transversely outwardly from opposite sides of rear edge of insulative body 2. Between pivot pins 3, a substantially semi-circular transverse portion 10 is formed integrally with insulative body 2 along a rear edge thereof. A flat surface 11 of transverse portion 10 opposes a resilient member, which may be in the form of a leaf spring mounted on the cover, as discussed in more detail hereinafter.

Side walls 12 are provided along the side edges of upper surface 2a of insulative body 2 and enclose cover 4 therebetween. Extending portions 13 are provided on opposite sides of the front edge of insulative body 2 to surround forwardly extending solder tails 9. An L-shaped side wall 14 is provided on one extending portion 13 along the edge thereof, and an inclined orienting wall 15 is provided on the inside of the other extending portion 13 to define the mounting direction of the SIM card, which is correspondingly shaped. On the rear side of the side edges of extending portions 13, an L-shaped engaging piece 16 is mounted. This L-shaped engaging piece forms a portion of a locking means between cover 4 and insulative body 2 which interengage when the cover is in its closed position to lock the cover to the insulative body. The engaging piece is fabricated of a separate metallic piece fixed to the insulative body and includes a fixing piece 17 horizontally extending from a base portion of engaging piece 16 and fixed within extending portion 13, and a horizontal projecting piece 18 projecting rearwardly away from extending portion 13.

Cover 4 is preferably stamped and formed of metal. Side walls 20 extend along and generally perpendicular to the side edges of a rectangular plate forming main body 19. Main body 19 is of a size substantially covering upper surface 2a of insulative body 2 and includes bearing portions 21 on a rear edge of side walls 20 each having an elongated hole 22 formed longitudinally of the respective bearing portion. By engaging the elongated holes with pivot pins 3 on insulative body 2, cover 4 is slidably pivotable relative to insulative body 2. Therefore, the rear edge of cover 4 serves as a base edge and the front edge serves as a free edge and allows cover 4 to pivotally move between an open and closed position. On a central portion of the inside of side walls 20, a bending piece 23 is formed, extending generally parallel to main body 19 and providing a guide 24 between opposite side walls 20 for inserting a card (FIG. 7) into cover 4.

On the front edge of side wall 20, a forwardly projecting actuating piece 25 cooperates with engaging piece 16 on the insulative body to form the locking means. Actuating piece 25 includes a horizontal edge 26 extending substantially flush with main body 19 and an inclined piece 27 extending obliquely downwardly from a tip of horizontal edge 26, and is adapted to slidingly contact horizontal projecting piece 18 of engaging piece 16 when cover 4 is pivoted toward insulative body 2.

A projecting piece 28 is integrally formed at the center of and perpendicular to the rear edge of main body 19. A cantilevered leaf spring 29 extends from opposite sides of projecting piece 28 toward bearing portion 21 to form the resilient member. Upon mounting bearing portion 21 of cover 4 on pivot pins 3 of insulative body 2, the ends of the leaf spring oppose flat surface 11 formed on transverse portion 10. When the cover is slidingly moved within elongated holes 22 relative to pivot pins 3, i.e., in a direction perpendicular to an axis defined by pivot pins 3 along the longitudinal direction of cover 4 toward the base edge thereof, leaf spring piece 29 opposes flat surface portion 11 and is resiliently deformed to bias cover 4, so that cover 4 is slidingly moved in the direction of the free end via the force of leaf spring 29. Therefore, pivot pins 3 are located on the rear edge, i.e. the base edge, of elongated hole 22 in the closed position. It should be noted that leaf spring 29 may be formed to be placed in the biased condition by flat surface portion 11 prior to slidingly moving cover 4 so that cover 4 is constantly biased toward the free end thereof. In the shown embodiment, it is when the cover 4 is slidingly moved toward the base edge that flat spring piece 29 biases cover 4 toward the free end thereof.

Apertures 30 are provided in main body 19 of cover 4 for directly accessing contact pieces 6 of terminals 5 for electrical or mechanical testing of the card reader connector. Furthermore, a reinforcing rib 31 may be formed on main body 19 adjacent to these apertures.

Figure 2:
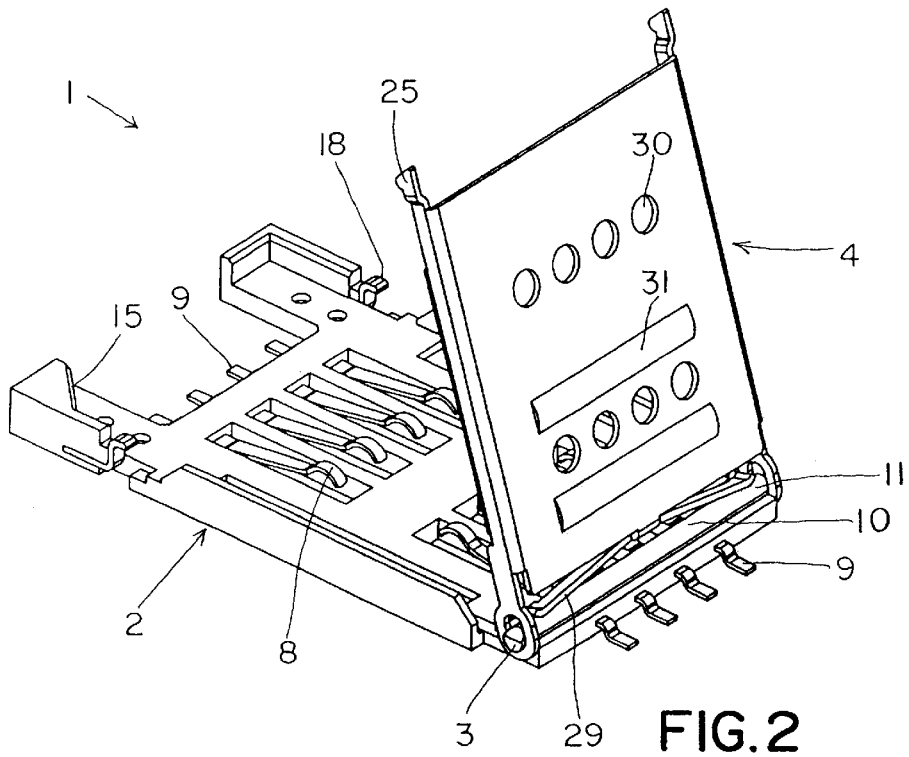
FIG. 2 is a perspective view of the first embodiment of the card reader connector, as viewed from the rear side with the cover is in its open position.
Figure 3:
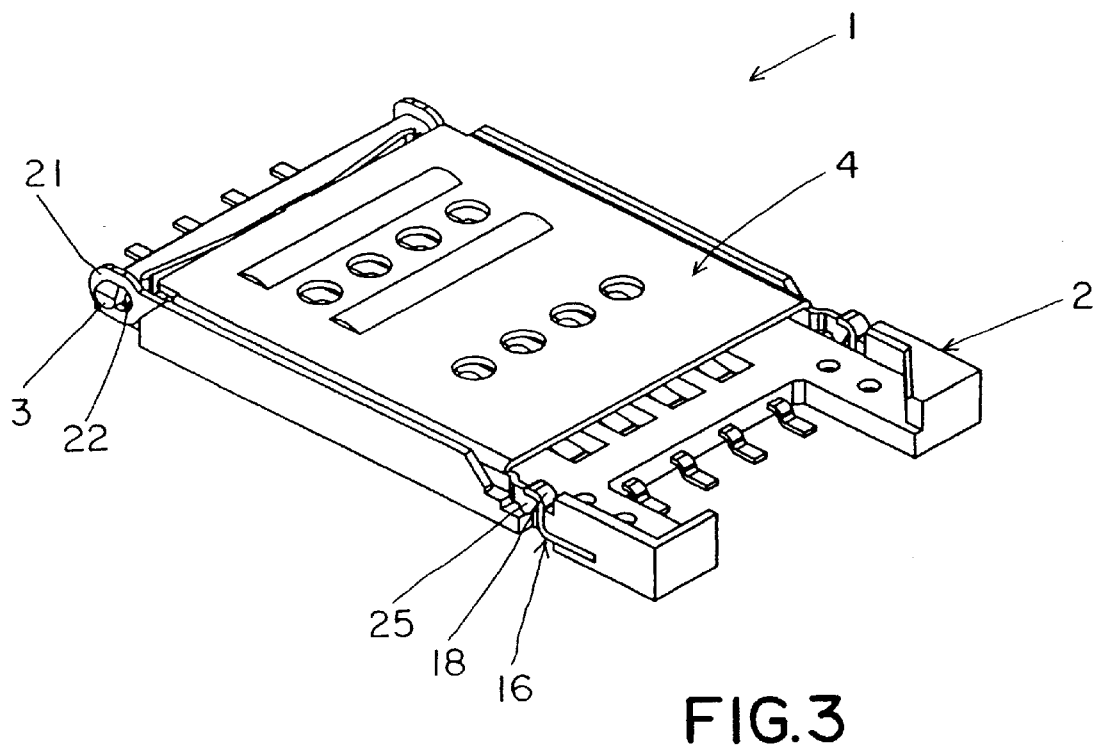
FIG. 3 is a perspective view of the first embodiment of the card reader connector, as viewed from the front side with the cover is in its closed position.
Figure 4:
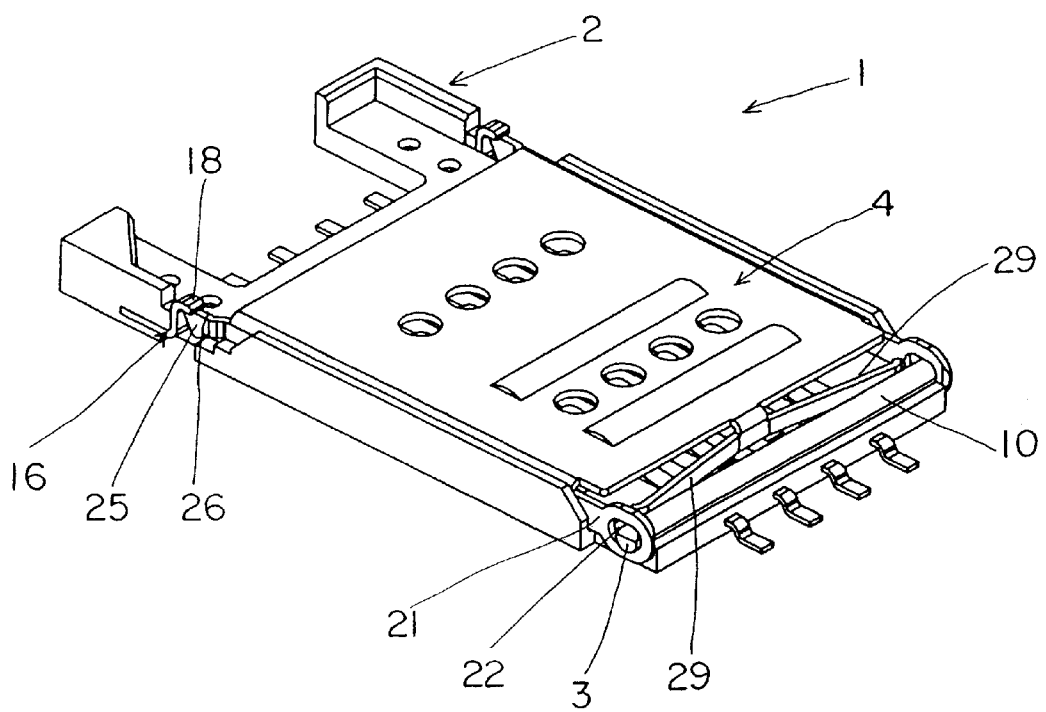
FIG. 4 is a perspective view of the first embodiment of the card reader connector, as viewed from the rear side with the cover in its closed position.

To mount the SIM card within the card reader connector, cover 4 is placed in its open position, as shown in FIGS. 1 and 2, and the SIM card is inserted between opposing guides 24 along main body 19. The end of the SIM card is stopped by abutting against projecting piece 28 forming the base portion of leaf spring 29. Next, cover 4 is pivoted toward insulative body 2 and moved to the closed position. When cover 4 approaches the closed position whereat the cover is almost parallel to insulative body 2, the locking means formed by actuating pieces 25 on opposite sides of the free end of the cover and engaging pieces 16 on opposite sides of the front edge of the insulative body enters into its interengaging position. First, inclined edges 27 of actuating pieces 25 slidingly contact horizontal projecting pieces 18 of engaging pieces 16 to slidingly move cover 4 rearwardly by resiliently deforming leaf spring 29 and moving cover 4 toward the rear edge of hole 22 during the movement of cover 4 to the closed position. When the cover is in the closed position, horizontal edge 26 is located below projecting piece 18 and the locking means is in its interengaging condition holding cover 4 in the closed position.

While cover 4 is in the closed position, the SIM card is held between cover 4 and insulative body 2, and the lower surface of the SIM card opposes upper surface 2a of insulative body 2. Consequently contact portions 8 of terminals 5 projecting above upper surface 2a of insulative body 2 are depressed, so that contact pieces 6 are resiliently deformed and establish electrical engagement between contact portions 8 of the card reader connector and contact pads of the SIM card by the resilient restoration force of contact pieces 6.

To remove the SIM card from the card reader connector, cover 4 is slidingly moved in a rearward direction, i.e. towards its base edge. A front edge of the SIM card will be exposed beyond the free edge of cover 4 extending to portions 13 of insulative body 2. Therefore, cover 4 is moved rearwardly by pushing one edge of the SIM card toward the rear or base edge of the cover. When cover 4 is slidingly moved toward the base edge, actuating pieces 25 of the locking means are correspondingly moved rearwardly beyond engaging pieces 16, so that the engagement between horizontal projecting pieces 18 and horizontal edges 26 is released. Since the SIM card is biased away from upper surface 2a of insulative body 2 by the resilient restoration force of contact portions 6, cover 4 will be pivoted upwardly toward the open position. At this point, it is possible to remove the SIM card by manually withdrawing it from cover 4. Therefore it is possible to remove the SIM card only when the cover is moved to its open position.

In the embodiment described above, the SIM card is inserted between guides 24 of cover 4. It is also possible to mount the card on insulative body 2 by forming guiding features on side walls 12 of the insulative body.

Figure 5:
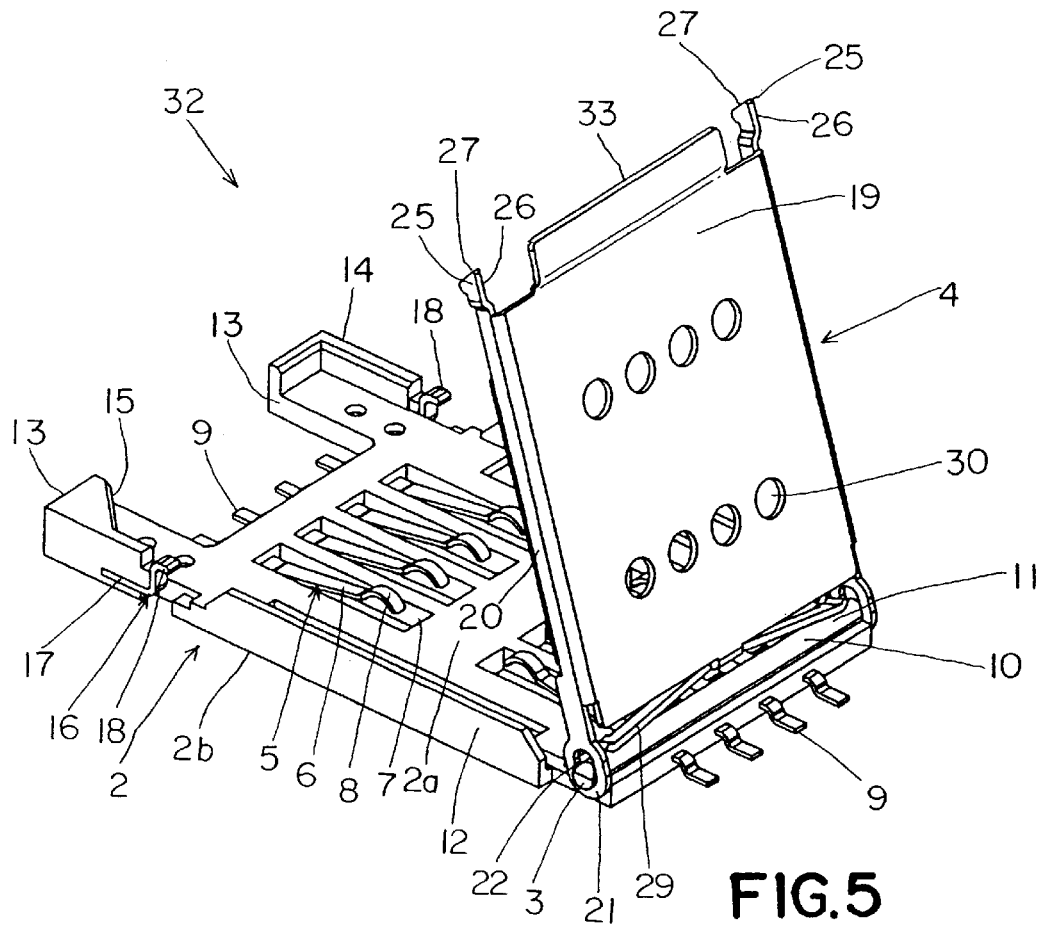
FIG. 5 is a perspective view of a second embodiment of the card reader connector, as viewed from the rear side with the cover in its open position.
Figure 6:
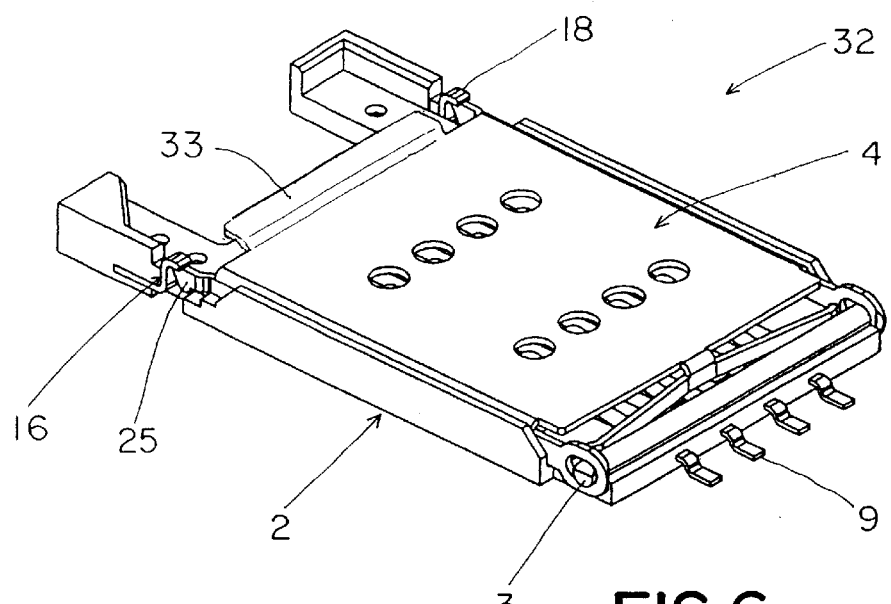
FIG. 6 is a perspective view of the second embodiment of the card reader connector, as viewed from the rear side with the cover in its closed position.

FIGS. 5 and 6 disclose a second embodiment of a card reader connector 32. The following description of the second embodiment may omit some detail where the reference numerals used correspond to the identical component parts of the first embodiment. The main difference between the card reader connector 32 of the second embodiment and the card reader of the first embodiment is the structure of cover 4. In the second embodiment, a gripping portion 33 extends forwardly from the free edge of cover 4 and reinforcing rib 31 (see FIG. 1 or FIG. 2) provided on main body 19 in the first embodiment is not present in the second embodiment.

As described above with respect to the first embodiment of the card reader connector, the locking mechanism of the second embodiment of the card reader connector is also adapted to move into an interengaging condition by pivoting cover 4 toward the closed position after inserting the SIM card in the cover. Furthermore, the engagement of the locking mechanism is released and the SIM card removable only by slidingly moving cover 4 rearwardly towards its base edge. Gripping portion 33 provides an area for gripping the cover by a user and therefore facilitates the movement of cover 4 between its open and closed position for insertion and removal of the SIM card.

Figure 7:
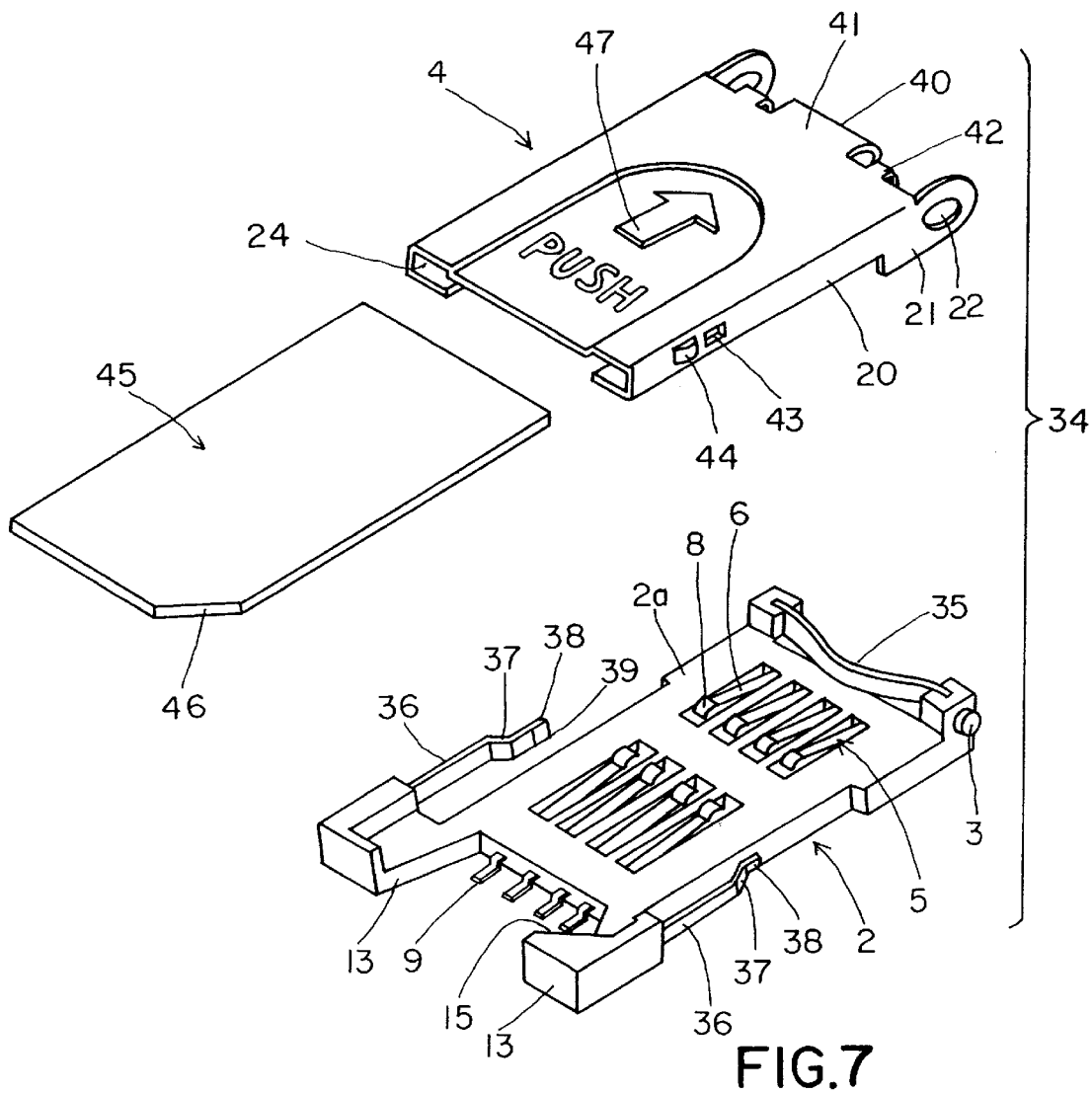
FIG. 7 is an exploded perspective view of a third embodiment of the card reader connector according to the present invention.
Figure 8:
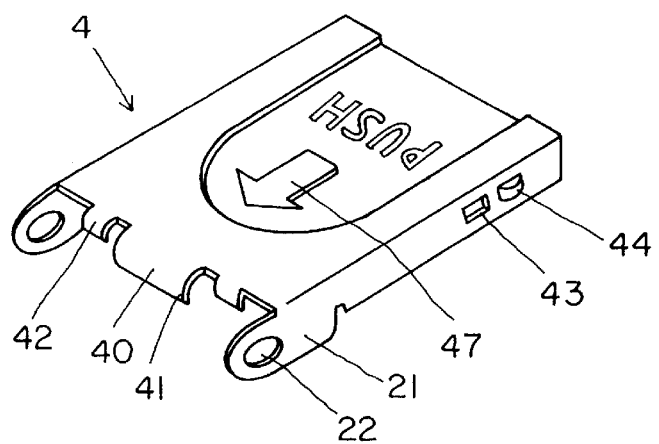
FIG. 8 is a perspective view of a cover of the third embodiment of the card reader connector as viewed from the rear side.

FIGS. 7 through 9 illustrate a third embodiment of a card reader connector 34. There are some differences between the structure of the card reader connector 34 and that of the first and the second embodiments of the card reader connectors 1 and 32. The differences will be discussed below, and the description may omit some detail where the reference numerals used correspond to the identical component parts of the first embodiment.

Figure 9A:
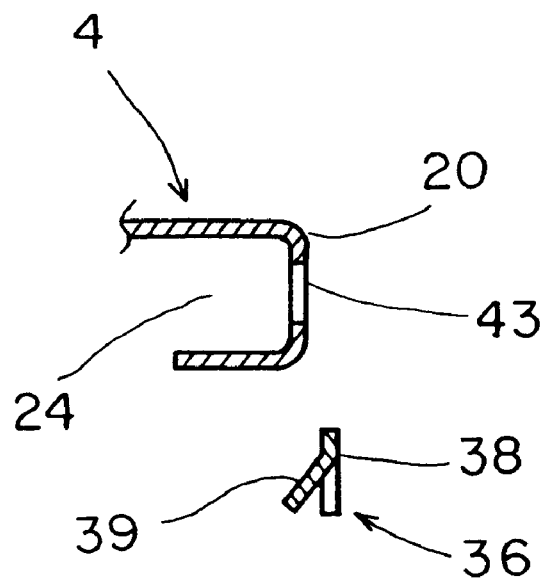
FIG. 9 is an enlarged section showing the relationship between a side wall of the cover and a short piece of an engaging arm, (a) shows the case of forming an opening portion on the side wall, and (b) shows the case of forming a recess portion on the side wall.

An arc-shaped leaf spring 35 comprises a resilient member and includes a forwardly projecting arcuate surface provided between pivot pins 3 on opposite sides of the rear edge of insulative body 2. A cantilevered engaging arm 36 extends rearwardly from each extending portion 13 along opposite sides of the front of insulative body 2. Engaging arm 36 includes an integral tip portion including an inclined piece 37 extending toward the side and rear of insulative body 2 and a short piece 38 generally parallel to the side of insulative body 2. Engaging arm 36 is adapted to be engaged and laterally spread via short piece 38. A downward and inward engaging projection piece 39 extends obliquely from the inside of short piece 38 as shown in FIG. 9(a). The dimension between short pieces 38 of engaging arms 36 on opposite sides of insulative body 2 corresponds to the transverse dimension of cover 4. Cover 4 is provided with a semi-circular spring mating surface 40 formed by a bending piece 41 along the base edge of the cover, this mating surface corresponds to the resilient member provided on the insulative body 2. A stopper 42 for abutting the bottom edge of the SIM card is provided on opposite sides of bending piece 41. Near the front edge of side walls 20 of cover 4, a locking surface in the form of a square hole forms opening portion 43 for forming the locking means in cooperation with short piece 38 of engaging arm 36. Adjacent to opening portion 43, an actuating projection 44 is provided which opposes inclined piece 37 of engaging arm 36. Reference numeral 45 in FIG. 7 denotes the SIM card. A cut edge 46 formed at one corner of the card corresponds to the inclined orienting surface 15 of insulative body 2.

In the card reader connector 34, when cover 4 into which SIM card 45 is inserted is pivoted toward the closed position toward insulative body 2, side walls 20 of cover 4 move between engaging arms 36 and deflect them, spreading them apart by slidingly contacting engaging projection piece 39 provided on short piece 38. Then, when engaging projection piece 39 opposes opening portion 43 of side wall 20, engaging arms 36 move back toward their undeflected state, so that engaging projection piece 39 is positioned within opening portion 43 to lock the cover in its closed position. By this action, the locking means is placed in its interengaging condition.

To remove the SIM card, the interengagement of locking means must be released by slidingly moving cover 4 against the resilience of leaf spring 35 in the direction of PUSH arrow 47, i.e. toward the base edge of the cover. Since inclined piece 37 of engaging arm 36 opposes actuating projection 44 formed on side wall 20 of cover 4, engaging arms 36 are deflected and spread apart in order to release the locking between engaging projection piece 39 of short piece 38 and opening portion 43 which accordingly releases the locking means when cover 4 is moved in the direction of its base edge. As in the first and the second embodiments, cover 4 is pivoted in the opening direction by the resilient restoration force of contact pieces 6 of terminals 5, at which time the SIM card can be easily removed.

The preferred embodiments discussed above are not to be taken as limiting to the disclosed invention. The resilient members disclosed as springs 29 and 35 can be in the form of springs such as a coil springs or the like. They can also be replaced with an element generating a reaction force in response to compression such as rubber or the like. Furthermore, this resilient member may be provided either on the cover side as shown in the first and second embodiments, or on the insulative body side as shown in the third embodiment.

Figure 9B:
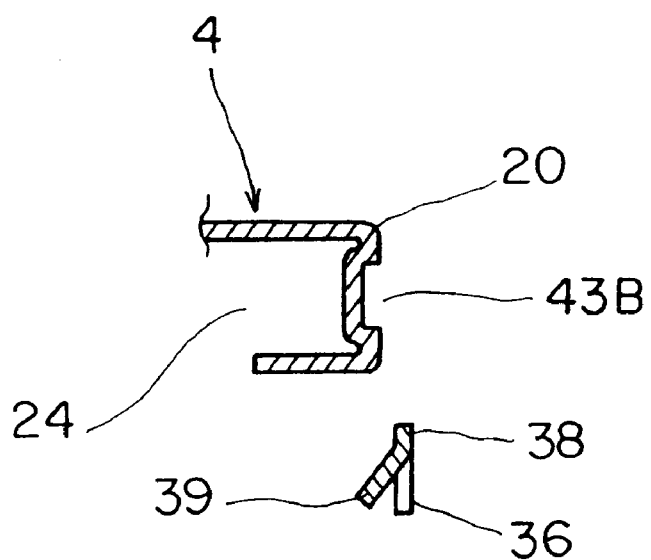

In the embodiments disclosed, cover 4 is made of metal, however it may be formed of other materials such as plastic or the like. Certain disclosed features do not have to be made strictly according to the above description. For example, opening portion 43 formed on side walls 20 of cover 4 in the third embodiment may be replaced with a recess portion. In the case of processing the sheet metal for example, recess portion 43B may be formed by an embossing process or semi-perf process as shown in FIG. 9(b).

In conclusion, according to the present invention, the locking means between the cover and the insulative body is engaged only by pivoting the cover toward the closed position, and the interengagement of the locking means is released only by slidingly moving or pushing the cover toward its base edge. Therefore such a card reader connector facilitates insertion and removal of a SIM card even if it is miniaturized. Furthermore, since the cover is provided with a recess for locking the cover in its closed position, there is no possibility of degrading the stiffness of the cover to obtain the high reliability and performance of the card reader connector.

Although the present invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention is not limited to the specific embodiments set out above but includes all possible embodiments which can be embodied within the scope encompassed including equivalents thereof with respect to the features set out in the appended claims.

We claim:

1. A card reader connector for a card, comprising:
   an insulative body including
      pivot pins formed at a rear edge of the body and
      terminals mounted on the body having contact pieces adapted to contact corresponding contacts of the card;
   a stamped and formed metallic cover pivotally supported on said insulative body by the pivot pins and movable between an open position and a closed position and in a direction perpendicular to an axis of said pivot pins;
   a resilient member in the form of a cantilevered leaf spring mounted on a rear edge of the cover for biasing the cover in a direction away from the said pivot pins when the cover is in its closed position; and
   locking means between the insulative body and the cover, wherein the locking means is held in an interengaging condition by a resilient force exerted by said resilient member.

2. The card reader connector as set forth in claim 1, wherein said locking means comprises an L-shaped engaging piece on said insulative body and an actuating piece on said cover, wherein the interengaging condition is effected by sliding contact between said engaging piece and said actuating piece when the cover is moved between the open position and the closed position.

3. The card reader connector as set forth in claim 2, wherein said L-shaped engaging piece further includes a horizontal projecting piece projecting rearwardly.

4. The card reader connector as set forth in claim 3 wherein said L-shaped engaging piece is a separate metallic member and includes a horizontal fixing piece mounted to a portion of the insulative body.

5. The card reader connector as set forth in claim 3, wherein said actuating piece includes a horizontal edge substantially flush with the cover and an inclined piece extending obliquely downward from the horizontal edge, whereby the inclined piece is adapted to slidingly contact the horizontal projecting piece of the L-shaped engaging piece when the cover is moved between its open and closed positions.

6. The card reader as set forth in claim 1, wherein said locking means comprise metallic engaging arms fixed on the insulative body which are adapted to be deflected apart by the cover when the cover is moved between the open position and the closed position.

7. The card reader as set forth in claim 6, wherein the engaging arm includes an engaging projection piece and the cover includes an actuating projection portion,
   wherein, when said cover is moved between the open position and the closed position, the engaging arms are deflected apart by sliding contact between the engaging projection piece and the actuating projection portion.

* * * * *